Dec. 6, 1927.　　　　　　　　　　　　　　　　　　　1,651,873
T. DE STEFANI
COOLER CABINET FOR SODA FOUNTAINS
Filed March 2, 1922
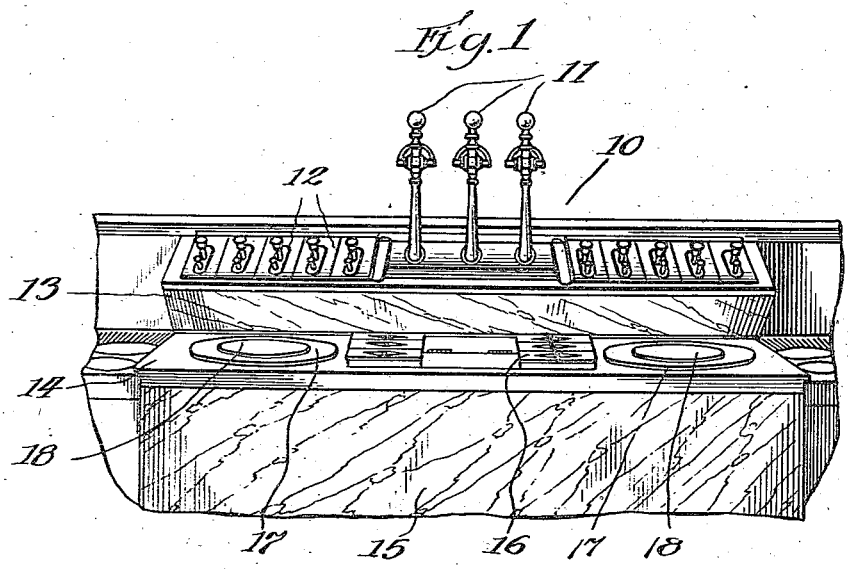
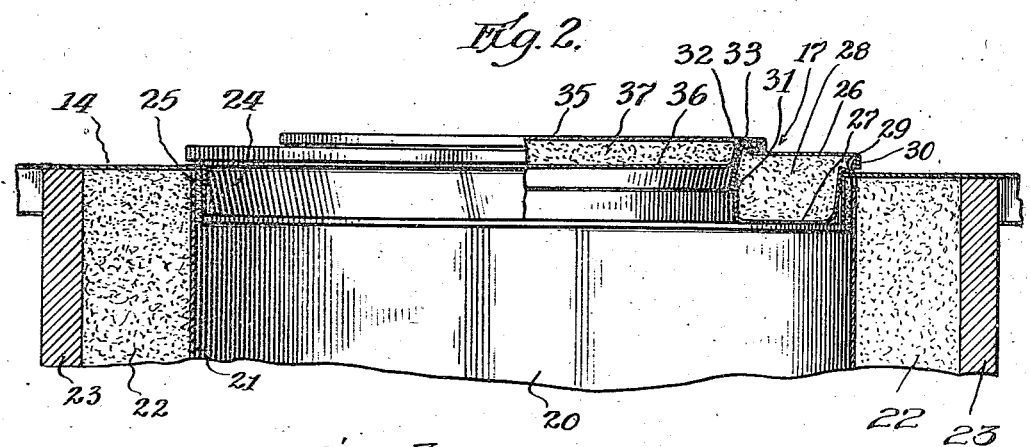
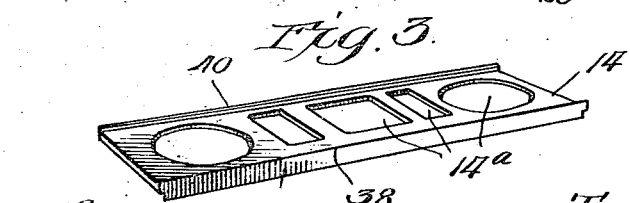
Inventor
Tully De Stefani Patented Dec. 6, 1927.

1,651,873

UNITED STATES PATENT OFFICE.

TULLY DE STEFANI, OF CHICAGO, ILLINOIS, ASSIGNOR TO LIQUID CARBONIC COMPANY, OF CHICAGO, ILLINOIS, A CORPORATION OF ILLINOIS.

COOLER CABINET FOR SODA FOUNTAINS.

Application filed March 2, 1922. Serial No. 540,635.

This invention relates to improvements in soda fountains and its purpose is to provide an improved ice cream cabinet.

The principal object of the invention is a soda fountain comprising an ice cream cabinet embodying improved heat insulating means. A further object is to provide an ice cream cabinet having means for preventing passage of heat from the upper capping to the interior lining of the cabinet. In cooler boxes of the form heretofore commonly used, the condensation and accumulation of moisture on the cover of the box has resulted in a very disagreeable and unsanitary condition, a great loss of refrigeration and efficiency; it is an important object of this invention to overcome these defects. Other objects relate to various features of construction and arrangement which will appear more fully hereinafter.

The nature of the invention will be understood from the following specification taken with the accompanying drawing in which one embodiment is illustrated. In the drawings:

Fig. 1 shows an interior front elevation of a soda fountain embodying the features of the present invention.

Fig. 2 shows a vertical section through an ice cream cabinet which constitutes the improvement of the present invention.

Fig. 3 shows a perspective view of the one-piece top or capping for the cooler box.

As illustrated in the drawings, the invention is shown in connection with a soda fountain 10 having a series of carbonated water and cold water faucets 11, and a series of receptacles 12 adapted to contain fruit juices and other flavors. The inner wall 13 of the series of receptacles 12 is inclined upwardly from the capping 14 which forms the top of the cooler box 15. This cooler box is provided with a series of receptacles closed by covers 16, these being adapted to contain crushed fruits or other materials, and in addition thereto the cooler box is provided with a pair of ice cream cabinets closed by covers 17, each cover having a removable lid 18.

The top cover or capping 14 of the cooler box is stamped from a single sheet of metal, preferably nickel silver or other suitable material. This one-piece capping is provided with a plurality of openings 14ª, as shown in Fig. 3, adapted to permit access to the various receptacles for ice cream, crushed fruit or the like. There may be one or more ice cream cabinets and a plurality of other receptacles as in the embodiment illustrated. One of the ice cream cabinets is illustrated particularly in Fig. 2 where the interior chamber 20 is shown as having a cylindrical lining 21, this lining being formed preferably of tinned copper or the like. A comparatively thick layer 22 of cork or other heat insulating material is provided around the lining 21 and the heat insulating material is enclosed by the outer walls 23 which are formed of marble or other suitable material. The capping 14 has its edges bent downwardly around the various openings 14ª to form flanges extending around these openings, as illustrated particularly by the annular flange 24 extending around the opening to the ice cream cabinet in Fig. 2. Each of these flanges is spaced inwardly from the metallic lining of the receptacle with which it is associated and the flange is insulated from the lining by an intermediate layer of heat insulating material. In Fig. 2 the lining 21 is shown terminating below the top capping 14 and an annular band 25 of heat insulating fiber is shown mounted between the upper part of the lining and the annular flange 24 which extends downwardly from the capping. This heat insulating material interposed between the capping and the several metallic linings of the receptacles prevents the passage of heat to these linings and overcomes objectionable sweating and accumulation of moisture on the top surface of the cooler box.

The various covers and lids, 16, 17 and 18, which are used for closing the openings 14ª in the capping 14, are each formed by two sheets of metal which are spaced apart to receive heat insulating material between them. This construction in connection with the cover 17 and lids 18 is illustrated particularly in Fig. 2 where each cover 17 is shown as comprising two sheets 26 and 27 of nickel silver or other suitable metal which are stamped in the proper shape to interfit with each other, thus forming an inner cavity adapted to be filled with cork or other heat insulating material 28. The outer edges of the lower plates 27 are crimped, as shown at 29, to form horizontal flanges adapted to rest on the upper surface of the capping 14 around the opening to the ice cream receptacle, and also to form an upwardly extending flange adapted to interfit with the downwardly turned flanges 30 on the upper cover plate 26. Where the cover 17 is provided with an opening adapted to be closed by the lid 18, the inner edge of each lower plate 27 is turned upwardly to form an annular flange 31 adapted to interfit with the downwardly turned flange 32 on the upper plate 26. Each upper plate is provided with an annular bead or rim 33 extending upwardly therefrom in proximity to the flange 32 to prevent contamination of the ice cream by materials collecting on the upper surfaces of the cover and the capping 14. The opening in each cover 17 is closed by the lid 18, previously referred to, which is circular in form and made up of two sheets 35 and 36 of nickel silver which are die stamped and telescoped together with the interior space filled by cork or other heat insulating material. The lower sheet 36 of the lid is formed to fit over the rim or bead 33 provided on the top of the cover 17 so that a substantially air tight closure is formed when the cover and lid are in position. The cover and lid construction, herein shown, are described and claimed in my copending application Ser. No. 540,636 filed March 2, 1922.

The construction of the soda fountain herein described is adapted to promote the cleanliness and sanitation of the apparatus when in use because of the fact that the parts are formed with very few joints or seams and are united without the use of rivets. The formation of the capping 14 in one piece is of particular advantage in facilitating the cleaning of the cover of the cooler box, and the absence of joints in this capping serves in conjunction with the use of the flanges extending downwardly into the openings 14ᵃ to permit the various covers to fit closely to the upper surface of the capping so that a tight contact is maintained and the loss of refrigeration prevented. A further feature of the construction of the capping is the provision of an integral ridge 38 which extends along the outer edge thereof, projecting above the top surface of the capping and having a flange 39 extending downwardly in alignment with the outer vertical surface of the cooler box. If desired, another integral ridge 40 may be provided along the inner edge of the capping. The construction of the ice cream cabinet prevents the passage of heat from the top cover or capping of the cooler box to the interior lining of the ice cream receptacle thus preventing any loss of refrigeration and overcoming any objectionable sweating or accumulation of moisture on the metal cover of the cooler box. The loss of refrigeration by either conduction or radiation is thus prevented by the construction of the cooler box and the one-piece construction of the capping cooperates with the absence of objectionable joints or seams in the covers and lids to provide a neat, attractive, and sanitary apparatus for soda fountain use.

Although I have shown and described one embodiment of the invention for purposes of illustration, it will be understood that it may be constructed in various other forms without departing from the scope of the appended claims.

I claim:

1. In apparatus of the class described, a cooler box for soda fountains having a receptacle provided with a metallic lining, insulating material around said lining, a flat metallic capping forming the outer top wall of said box, a cover for said receptacle, and insulating means disposed between the inner side of said lining and said capping to prevent the conduction of heat from said cover through said capping to said lining.

2. In apparatus of the class described, a cooler box for soda fountains having a receptacle, a flat metallic capping forming the outer top surface of said box, a metallic lining for said receptacle spaced downwardly from said capping, said capping having a downwardly extending flange spaced from said metallic lining, and heat insulating means interposed between said lining and said downwardly extending flange of said capping.

3. In apparatus of the class described, a cooler box having a receptacle provided with a metallic lining, a metallic capping for said box having a flange extending downwardly into said receptacle, and a heat insulating band mounted between said flange and said lining.

4. In apparatus of the class described, a cooler box having a receptacle, a metallic lining for said receptacle, a metallic cover for said box spaced above the upper edge of said lining and having an aperture therein above said receptacle, the edges of said cover around said aperture being bent downwardly to form a flange spaced from said lining, and a band of heat insulating material interposed between said flange and said lining.

5. In apparatus of the class described, a cooler box having a plurality of receptacles, a metallic capping for said box provided with an aperture over each of said receptacles, a metallic lining for each of said receptacles, heat insulating material interposed between each of said linings and said capping, and a heat insulated cover for each of said openings.

6. In apparatus of the class described, a cooler box having a one-piece metallic capping provided with a plurality of openings therein and having integral flanges extending downwardly around each of said openings, said capping being further provided with an integral ridge extending upwardly along the edge thereof.

7. In apparatus of the class described, a cooler box, and a rectangular one piece capping secured permanently in fixed position on said box and having a flat upper surface provided with a plurality of openings, said capping being provided along its forward edge with an upwardly extending shoulder and having the ends thereof free of obstructions.

8. In apparatus of the class described, a cooler box for soda fountains comprising a horizontally extending one-piece rectangular capping mounted permanently in fixed position and having a flat upper surface provided with a plurality of openings, metallic receptacles beneath said openings, said capping having flanges around each of said openings extending downwardly into said receptacles, and means for insulating said receptacles from said flanges of said capping.

TULLY DE STEFANI.